Aug. 13, 1940.  W. H. PRATT  2,211,606
LIQUID LEVEL INDICATOR
Filed Feb. 8, 1939
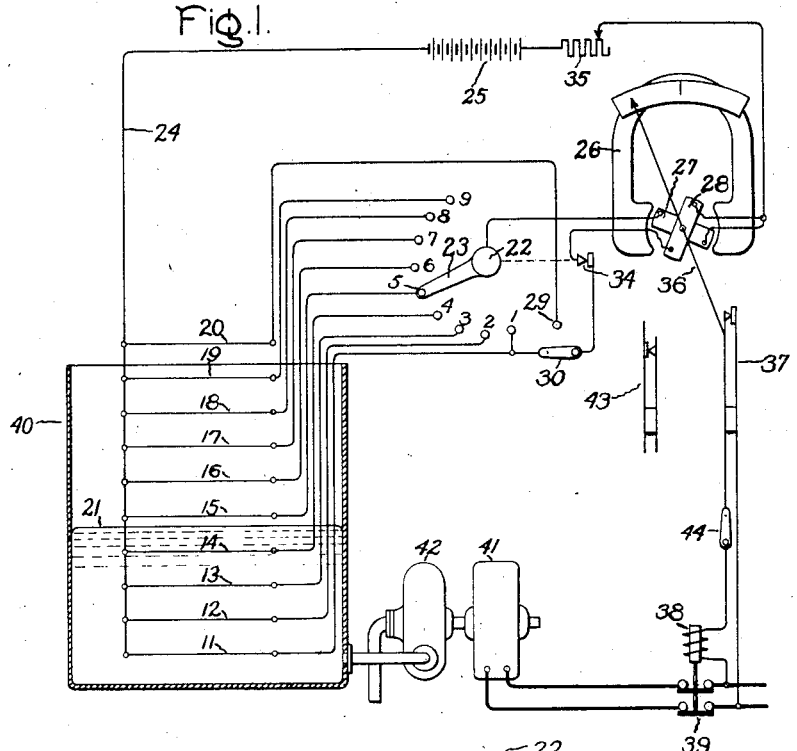
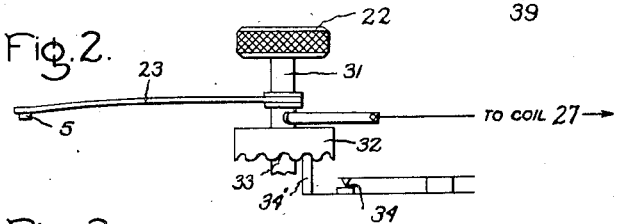
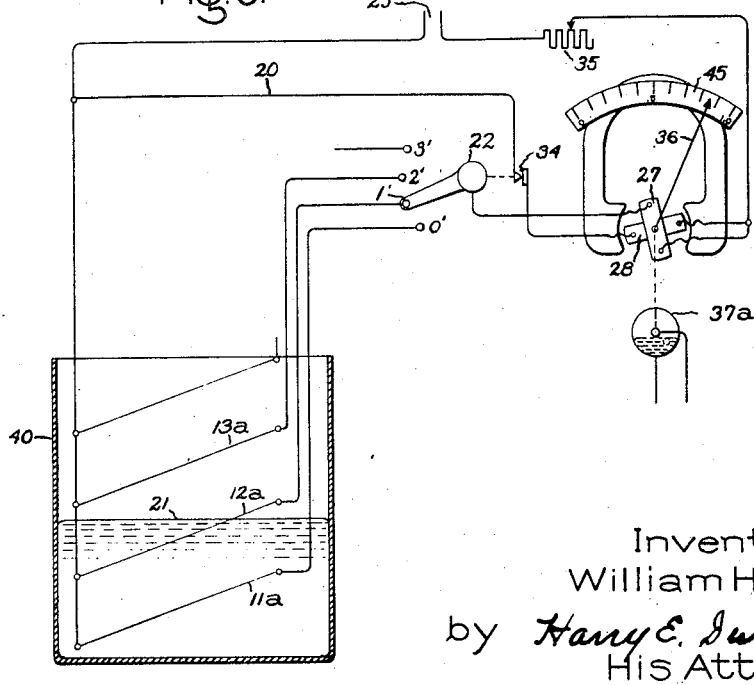
Inventor:
William H. Pratt,
by Harry E. Dunham
His Attorney.

Patented Aug. 13, 1940

2,211,606

UNITED STATES PATENT OFFICE 2,211,606

LIQUID LEVEL INDICATOR

William H. Pratt, Lynn, Mass., assignor to General Electric Company, a corporation of New York Application February 8, 1939, Serial No. 255,300

6 Claims. (Cl. 73—295)

My invention relates to liquid level indicators and controllers and its object is to provide a simple, inexpensive, reliable, and rugged apparatus of the class described.

My invention is based on the fact that a small wire, when carrying current of appropriate strength, will heat up when immersed in a liquid very much less than when surrounded by air or vapor. If, then, several similar wires are placed at different levels in a tank or other liquid container, those which are immersed in the liquid will be much cooler than those above the liquid level when traversed by similar heating currents. If the wires are of a material having an appreciable temperature coefficient of resistance, it is then a simple matter to determine the liquid level by a comparison of the resistance of wires at different levels. Wide changes in the temperature of the liquid or the vapor medium above the liquid do not impair the utility of the invention.

The features of my invention which are believed to be novel and patentable will be pointed out in the claims appended hereto. For a better understanding of my invention reference is made in the following description to the accompanying drawing in which Fig. 1 is a wiring diagram of my invention illustrating its use for indicating and controlling the liquid level in a tank; Fig. 2 is a detail of the dial switch used in Fig. 1; and Fig. 3 is a modification of Fig. 1 for more accurate determination of liquid level.

In the drawing 40 represents a tank or other liquid container in which a liquid 21 is contained. At various elevations in the tank are placed similar resistance wires numbered from 11 to 19. These wires will preferably be made of a material that does not deteriorate when contacted by the liquid or vapor used in the tank. Bare nickel wires may be used where the liquid is water. In an acid tank the wires should be covered by a thin coating of some acid-resisting insulating material such as the material described in United States Patent 2,085,995, July 6, 1937. The wires should also have a substantial temperature coefficient of resistance so that they change in resistance with temperature changes. The wires 11 to 19 are connected at one end by suitable individual lead wires to contacts 1 to 9 inclusive of a dial switch having a handle 22 and movable contact 23, and the other ends are jointly connected by a wire 24 to one side of a source of supply 25 preferably of 100 volts or more. The other side of the source of supply is connected to one side of a measuring instrument of the differential or ratio type. This instrument has cross coils 27 and 28 and the lead therefrom to the supply 25 is common to both coils. Coil 27 is connected to the movable arm 23 of the dial switch and coil 28 is represented as being connected to the bottom wire 11 in the tank. It will be noted that a wire 20 preferably similar to the wires 11 to 19 inclusive is placed outside the tank and is connected between common lead 24 and the contact 29 of a switch 30. In the operation of the apparatus as here represented either wire 20, which is never immersed in the liquid, or the bottom wire 11 may be used as a reference resistance wire. These comparison wires are preferably, although not necessarily, similar to the other wires. With switch 30 positioned as shown connecting coil 28 through bottom resistance wire 11, the latter is used as the reference resistance wire and, in such case, it is always assumed to be immersed in the liquid. In this case resistance wire 20 is not used and likewise contact 1 of the dial switch is not used. The wires 11 to 20 are fine wires of small diameter and high resistance as compared to the lead wires and other circuit connections of the instrument 26 and hence the resistance and changes in resistance of the resistance wires 11 to 20 predominate in determining the current flow through any circuit that may be completed. The wires 11—20 are also made small in diameter in order that the measuring currents may be small. Equal currents through coils 27 and 28 of the instrument produces a balanced differential effect and a zero center scale reading of the instrument.

In the illustration, coil 27 of the instrument is connected through contact 5 of the dial switch and resistance wire 15. Coil 28 of the instrument is connected through switch 30 and resistance wire 11. Sufficient current flows through the resistance wires thus connected that ordinarily if these wires were suspended in air their temperatures would be quite warm or even hot. However, as noted, wire 15 is above the liquid level and wire 11 is below the liquid level. Hence, while the temperature and the resistance of wire 15 are raised appreciably, the heat from wire 11 is readily conveyed to the liquid in which it is immersed and hence operates at a lower temperature and hence lower resistance than wire 15. As a consequence, the current through coil 28 is larger than through coil 27 and the instrument is unbalanced and deflects to the left. This is an indication that the liquid level is below wire 15 but above wire 11. If dial switch is now turned to contact 4 to connect resistance wire 14 in circuit, the currents through the coils will be equalized because both wires 11 and 14 are immersed and hence operate at equal temperatures and resistances. The instrument indication returns to the zero center and the operator thus ascertains that the liquid level in the tank lies between wires 14 and 15. Similarly, if the liquid level was between wires 17 and 18 the operator would turn his dial switch clockwise to find that he obtained zero instrument indications at contacts 5, 6 and 7 but a deflection on contact 8 indicating the liquid level to be between wires 17 and 18.

When the circuit of coil 27 is opened in moving the dial switch from one contact to the other, it may be desirable to open the circuit of coil 28, also to avoid waste of energy and prevent the instrument from producing a false indication, etc. This may be accomplished by providing a cam 32 on the shaft 31 of the dial switch as indicated in Fig. 2 having notches 33 angularly spaced with the contacts 1 to 9 inclusive, which notches cooperate with an insulated cam follower 34' for operating the resilient contacts 34 in the circuit of coil 28 as indicated in Fig. 1. The notches 33 are so positioned that contacts 34 are closed when contact arm 23 is on any one of the contacts 1 to 9 inclusive, but opens as and when arm 23 is turned from one contact to another. The cam arrangement also serves as a positioning device and such dial switch may be used to open the parallel instrument circuits when the apparatus is not being used, by leaving the shaft 22 in the proper rotary position.

Instead of using wire 11 as the reference resistance wire, I may use resistance wire 20 for this purpose. In this case switch 30 is moved to contact 29 to include resistance wire 20 in the circuit of coil 28. Now wire 20 and wire 15, which is just out of the liquid, will produce a zero center indication but if the dial switch be moved to contact 4 to connect resistance wire 14 in the circuit of coil 27, the instrument will produce a deflection to the right of zero due to the low temperature and resistance of immersed wire 14 as compared to wire 20 and the resulting greater current flow in coil 27 as compared to coil 28. The bottom resistance wire 11 may now be used as a test wire and the lead connected thereto is provided with the contact 1 at the dial switch for that purpose. The dial switch may be graduated with numbers representing the distance in feet or inches from the bottom of the tank of the resistance wires to which the contacts are connected. Ordinary and even wide variations in temperature of the air or liquid do not interfere with the positive operation of this apparatus. Even suppose the temperature of the liquid should rise to a point where no heat transfer occurs from the immersed wire to the liquid. Then it would only be necessary to increase the heating current through the wires to a still higher temperature. The limit in this direction is the melting point of the wires. Where the liquid or the vapor above it is inflammable, high wire temperature should not be used. A variable resistance 35 may be provided in the supply circuit to adjust the voltage and heating currents from time to time to obtain the desired sensitivity. One is not concerned with a particular scale distribution on instrument 26 but only with a distinct deflection when there is a marked difference in resistance in the two wires under comparison. Hence, considerable variations in temperature changes of the cooling mediums and in the supply voltage do not interfere with the successful operation of this device. The zero indication point of the instrument scale may be placed to one side of the center or at the end of the scale represented, and in fact, a scale as such is unnecessary. Only a zero indication reference point is required.

The apparatus above described as an indicator for determining liquid levels is ideal for controlling purposes. For this purpose the pointer 36 of the indicator is arranged to open or close a relay contact when there is a positive change in the deflection. Such relay contact is shown at 37 in the circuit of a relay 38 which, when energized, closes power switch 39 of a motor 41. Motor 41 is represented as driving a pump 42 for pumping liquid into tank 40. For the connections of the apparatus represented, instrument 26, acting as a controller, will hold the liquid level 21 of tank 40 at about the level of wire 15 by opening and closing switch 39 as the liquid level rises above and falls below resistance wire 15. Here the resistances of wires 11 and 15 are being compared and a deflection of the instrument results in wire 15 being out of the liquid. This closes relay contacts 37 as shown. When the liquid level has been raised by operation of the pump to immerse wire 15, the resistances of wires 11 and 15 will be equalized or approximately so and contacts 37 will open, switch 39 will open and the pump will stop. Obviously the liquid level of the tank may be controlled for any other level by changing the position of dial switch 22, to move contact arm 23 to some other contact 2 to 9. Contact 37 is a normally open contact which is closed by scale deflection of the instrument pointer to the left. If a normally closed contact is desired, it may be arranged as represented at 43, positioned to be opened by deflection of the instrument pointer to the right. The normally closed relay contact 43 would be used to control the pump in case the wire 20 is used as the reference or standard resistance wire instead of wire 11. In case the pump or other control is not to be used, a switch 44 in the relay circuit is opened. It is feasible to use the torque of instrument 26 for operating relay contacts, since it may be made sufficient for this purpose without interfering with the type of indication in which we are here interested. Moreover, the opening and closing of the relay contact is positive due to a quite sudden, as distinguished from a gradual, change in the resistance of the wire such as 15 as it is immersed or exposed by the rise and fall of the liquid in tank 40.

In case it is desired to obtain a more exact indication of liquid level between different test wires, the resistance wires corresponding to wires 11 to 19, Fig. 1, could be inclined to the horizontal as shown for the wires 11a, 12a and 13a in Fig. 3, and the scale of the indicating instrument between zero and full indication calibrated to indicate the percentage of a wire 13a, for example, which is immersed in terms of liquid level. The operation of such an arrangement would be the same as in Fig. 1 (using comparison resistance 20) until that wire which is partially immersed is located by operation of the dial switch and observing the presence or absence of an instrument deflection. Thus the slanting wires could be spaced a foot apart and have a one foot slant and the dial switch calibrated in feet. Then the instrument scale 45 could be calibrated in inches or, as in this case, tenths of a foot. In this case it would be advisable to have the instrument zero at one end of the scale so as to be able to use the full length thereof as represented in Fig. 3. For an instrument coil arrangement like Fig. 1 and using comparison resistance 20, the pointer 36, Fig. 3, will stand at the left hand end of the scale when the current in its two coils is equal and will deflect to the right as the current in wire 12a increases, as more and more of it is immersed and would stand at the right end of the depth scale of the instrument for full instrument deflection when the wire 12a is fully immersed. The instrument scale would be calibrated under the average temperature conditions of liquid and air. Then for any other temperature or voltage variation condition that would otherwise cause an error in the instrument reading, the resistance 35 would be adjusted until it gives a full scale deflection with coil 27 connected to a completely immersed wire such as 11a. This recalibrates the instrument for the changed condition quickly and easily.

In Fig. 3 the partially immersed wire 12a is found by turning dial switch 22 and noting the instrument deflection. On the 2' contact the instrument would read zero, since wire 13a is out of the liquid, and hence it is ascertained that the liquid level is between one and two feet. The more exact measurement is obtained by reading the instrument scale 45. The liquid level indication shown in thus 1.85 feet. It is apparent that this measurement scheme gives a very close reading and its accuracy or sensivity does not diminish even though the range of liquid level measurement be made very great, since as many resistance wires and dial switch contacts may be added as is necessary without changing the measurement conditions. Thus the scheme is just as accurate for a tank depth of 100.5 feet as it is for a tank depth of 5.5 feet.

If relay control is desired with the arrangement of Fig. 3 it would be preferable to use a form of contact device that requires little torque from the instrument. For example, I could rotate a small button type mercury switch 37a with the instrument shaft as indicated. This type of switch is described in U. S. Patent 2,101,115, Dec. 7, 1937. The liquid level at which the relay function is to be performed may be set in feet by positioning dial switch 22 and in fractions of a foot by rotatively adjusting switch 37a on the instrument shaft.

In accordance with the provisions of the patent statutes, I have described the principle of operation of my invention together with the apparatus which I now consider to be the best embodiment thereof, but I desire to have it understood that the apparatus shown is only illustrative and that the invention may be carried out by other means.

What I claim as new and desire to secure by Letters Patent of the United States is:

1. Liquid level determining apparatus comprising a liquid container, a plurality of similar resistance units having a temperature coefficient of resistance placed at different elevations in said container so as to be progressively immersed as the liquid level rises therein, a comparison resistance, a source of supply, a circuit for transmitting a heating current through one of said resistance units from said source, said circuit including switching means for selecting any one of said resistance units, a parallel circuit for transmitting a heating current through said comparison resistance and a measuring instrument responsive to the relative magnitude of the currents in said parallel circuits.

2. Liquid level determining apparatus comprising a liquid container, a plurality of resistance units placed at different elevations in said container so as to be progressively immersed as the liquid level rises therein, a comparison resistance placed so as to be unaffected by the rise and fall of liquid in said container, said resistance units and comparison resistance being similar and all having a temperature coefficient of resistance, a source of supply, parallel circuits for impressing substantially similar voltages from said source across said comparison resistance and any selected one of said resistance units of sufficient magnitude to cause appreciable heat loss therein, and means responsive to the relative magnitude of the currents in said parallel circuits.

3. Liquid level determining apparatus comprising in combination with a liquid container, a plurality of resistance units equally spaced at different elevations in said container so as to be progressively immersed as the liquid level in such container rises, a comparison resistance which is always immersed in the liquid, the resistance units and comparison resistance being similar and all having a temperature coefficient of resistance, a source of supply, parallel circuits for impressing substantially similar voltages from said source across said comparison resistance and any selected one of said resistance units of sufficient magnitude to cause appreciable heat loss therein, and indicating means responsive to the relative magnitude of current flow in said parallel circuits.

4. Liquid level determining apparatus comprising in combination with a liquid container, a plurality of resistance units placed at different elevations in said container so as to be progressively immersed as the liquid level in such container rises, a comparison resistance which is placed so as to never be immersed by the liquid, said resistance units and comparison resistance being similar and made of fine wire having a substantial negative temperature coefficient of resistance, a source of supply, parallel circuits through which heating currents from said source may be conducted through said comparison resistance and one of said resistance units, a dial switch for selecting any one of the resistance units to be included in the parallel circuit, and a measuring instrument responsive to the relative magnitude of the currents in the parallel circuits.

5. Liquid level indicating apparatus comprising in combination with a liquid container, a plurality of resistance wires placed at different elevations in said container and each resistance wire being similarly inclined to the horizontal so that the different wires will be progressively immersed and each resistance wire will be progressively immersed as the liquid level rises in said container, said wires being similar and having an appreciable temperature coefficient of resistance, a source of supply, a dial switch and circuit connections for selectively connecting any one of said resistance wires to said source of supply, a comparison resistance uninfluenced by changes in liquid level in said container also connected to said source of supply, and a differential measuring instrument connected to respond to the relative magnitudes of the currents through the comparison resistance and the resistance wire selected by said dial switch, said measuring instrument having a scale calibrated with the instrument to indicate the percentage immersion of an inclined wire in terms of liquid level thereon.

6. Liquid level indicating apparatus comprising a liquid container, a plurality of similar resistance wires having a substantial negative temperature coefficient of resistance equally spaced at different elevations in said container and each resistance wire being similarly inclined through a vertical distance equal to the spacing between adjacent wires, a source of supply, a dial switch and circuit connections whereby a heating current may be supplied by said source to any selected one of said wires, a comparison resistance similar in resistance and temperature coefficient to one of said resistance wires but so placed as to be uninfluenced by the rise and fall of liquid in said container, connections for supplying a heating current to said comparison resistance from said source, and a differential measuring instrument responsive to the relative magnitude of the currents supplied to said comparison resistance and the resistance wire selected by said dial switch, said dial switch being marked to indicate the resistance wires selected thereby in terms of liquid depth units and said instrument having a scale calibrated with the instrument to indicate the percentage immersion of an inclined wire in liquid depth units such that when the dial switch connects that wire which is partially immersed in the liquid, the sum of the indications of dial switch and instrument gives the liquid level in the container.

WILLIAM H. PRATT.